United States Patent
Titt

[15] 3,704,919
[45] Dec. 5, 1972

[54] AXIAL ANTIFRICTION BEARING

[72] Inventor: Georg Titt, Obere Vorstadt 9, D-8358 Vilshofen, Germany

[22] Filed: Dec. 7, 1970

[21] Appl. No.: 95,807

[30] Foreign Application Priority Data

Dec. 8, 1969  Germany.....................P 19 61 468.7

[52] U.S. Cl......................308/6 C, 308/215, 308/217
[51] Int. Cl.......F16c 29/06, F16c 33/50, F16c 33/36
[58] Field of Search......................308/6 C, 217, 215

[56] References Cited

UNITED STATES PATENTS

| | | | |
|---|---|---|---|
| 3,086,824 | 4/1963 | Barkley | 308/6 C |
| 3,219,398 | 11/1965 | Anderson | 308/6 C |
| 3,466,101 | 9/1969 | Hudson | 308/6 C |
| 1,250,367 | 12/1917 | Sharpneck | 308/217 |
| 3,190,703 | 6/1965 | Thomson et al. | 308/6 C |
| 3,194,612 | 7/1965 | Striepe | 308/6 C |

FOREIGN PATENTS OR APPLICATIONS

| | | | |
|---|---|---|---|
| 1,378,940 | 10/1964 | France | 308/217 |

*Primary Examiner*—Martin F. Schwadron
*Assistant Examiner*—Barry Grossman
*Attorney*—Steinberg & Blake

[57] ABSTRACT

An axial roller bearing assembly adapted to move parallel to the axis of a shaft which carries the assembly. The shaft is circumferentially enclosed at least in part by a sleeve member which extends more than half way around the shaft and which is spaced therefrom to define between the sleeve member and the shaft longitudinal paths of movement for a plurality of rows of roller bodies. Each row of roller bodies is guided for movement along an endless path extending between the sleeve member and the shaft, around the ends of the sleeve member, and along the exterior of the sleeve member. The endless path of movement for each row of roller bodies has a load-carrying zone situated between the sleeve member and the shaft and a return zone situated at the exterior of the sleeve member. Each of the roller bodies has a central elongated portion of hourglass configuration conforming substantially to the circumferential curvature of the shaft, and this central elongated portion is situated between a pair of tapered end portions of each roller body, these end portions being symmetrically arranged with respect to the central elongated portion. The end portions and the central elongated portion of each roller body are interconnected by a pair of symmetrically arranged cylindrical portions which directly engage the external surface of the shaft and the internal surface of sleeve member at the loadcarrying zone of each endless path for each row of roller bodies.

11 Claims, 7 Drawing Figures

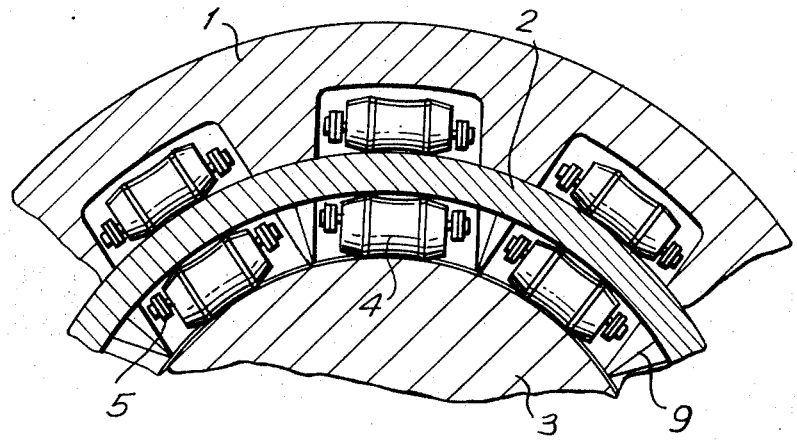
FIG.1A
FIG.1B
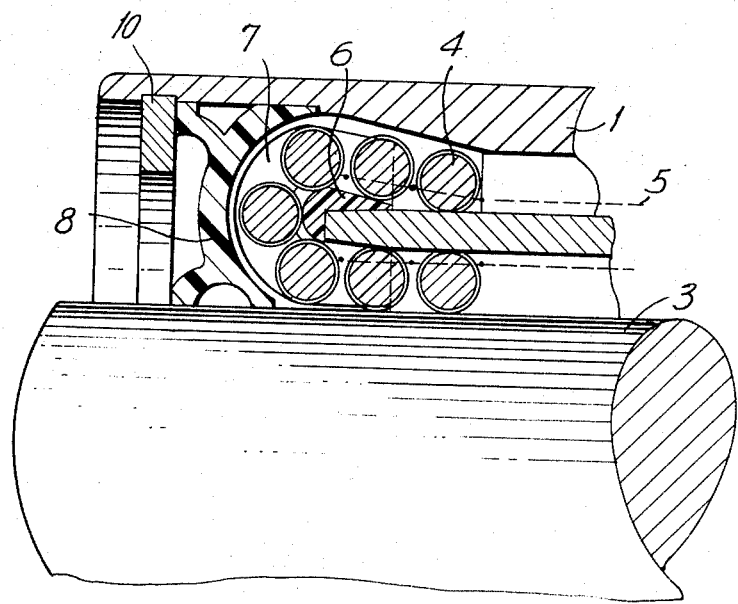

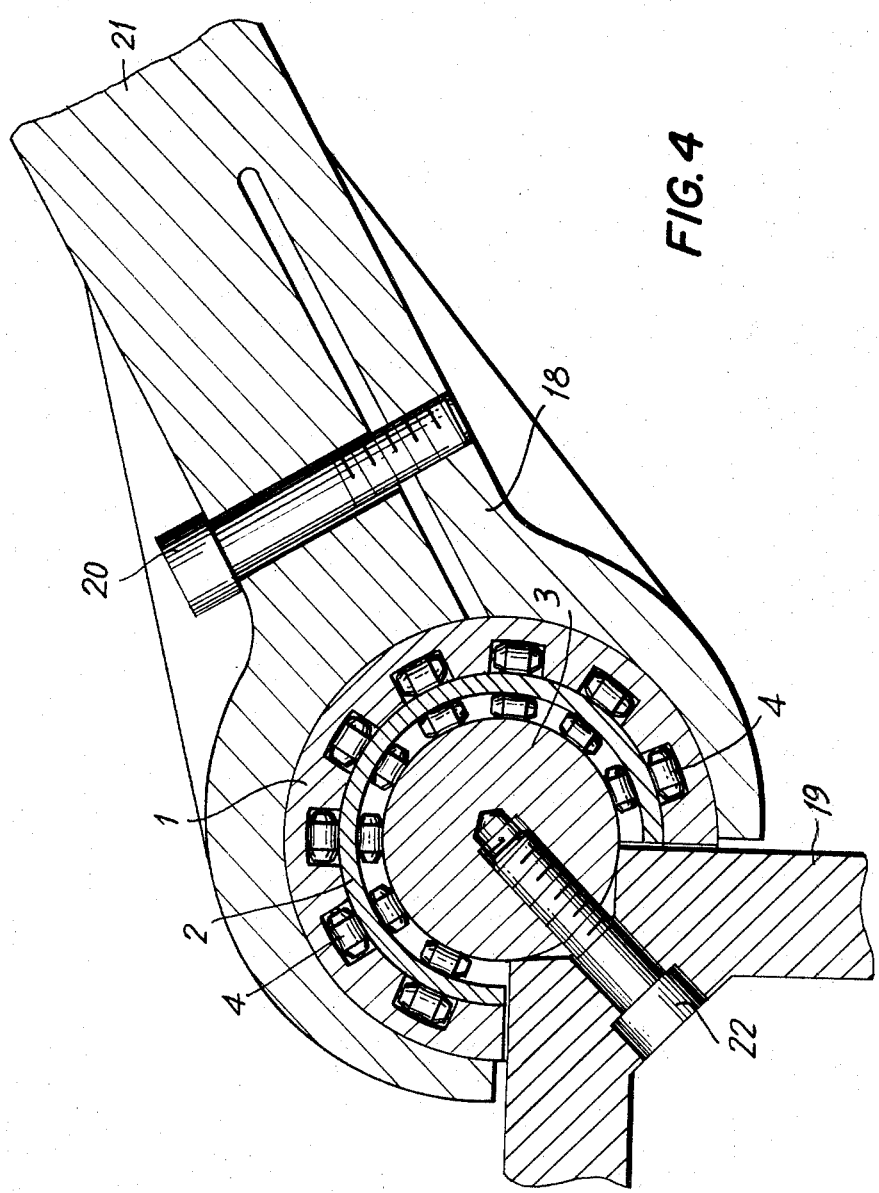

AXIAL ANTIFRICTION BEARING

The invention relates to an antifriction-bearing used for guiding a sleeve on a shaft or column in longitudinal direction. Such longitudinal or axial guideways with circulating balls are known. The ball circulation permits a continuous run. However there is the disadvantage that at least on the shaft the bearing capacity of the ball is very little. Damage will occur on the ballraces after a relatively long run or under an oscillating load. An improved embodiment may be obtained by arranging races for the balls along the shaft. This step results, however, in a substantial increase in costs and has a disadvantageous effect on seals. The balls have to be guided in their race , and therefore it is required to arrange a guide cage in the load zone , the free zone and the return pass.

A much higher load capacity can be obtained by using rolling-elements as they are used with the "Thomson Roundway Bearing." There the globoidal-shaped rolls are adapted to the curvature of the shaft and can continuously run on a counterpart which is formed accordingly. However the arrangement has the disadvantage that it requires much space and expenditure. Furtheron there is no guideway surrounding the shaft.

It is also known that such globoidal rolls may be elongated on both ends by an attachment which is substantially barrel-shaped and adapted to the curvature of the sleeve. These rolls can run in a guide-cage between the shaft and the sleeve several races being distributed on the entire circumference. Thus a guideway is provided on all sides . The disadvantage is that a guideway exists only as long as the cage is still located in the sleeve with the cage running with about half the speed of the sleeve. Experiments for arranging such rolling-elements in a manner similar to roll-circulating guideways showed than an objectionable run is impossible in the load zone. The reason rises from the fact that the edges between the globoidal and the barrel-shaped part slide off one against the other . Therefore the rolling elements run in a staggered manner and are deflected out of their positions perpendicular to their paths of movement, which results in a run no longer unobjectionable.

The object of the invention is to eliminate these disadvantages and to obtain moreover further advantages.

This problem is solved by constructing the rolling elements in a form where a mutual deflection out of the race cannot occur when the rolling elements run one adjacent the other and by proposing a guideway for said rolling elements which permits an unobjectionable run in the load zone and an easy return pass.

According to the invention the rolling element has three parts and two further short cylindrical parts at the transition from a central part of globoidal or hourglass configuration to a pair of end, tapered, barrel-shaped parts. The length of this cylindrical part is to be sufficient for the permanent contact of the rolling elements at these cylindrical parts in practical operation. A further advantage of this structure consists in the fact that the measuring of the rolling elements on these cylindrical parts is substantially simpler when being produced than on any other part. Therefore it is possible to sort out or separate the parts in a much easier way, as is also required in the ball-bearing production.

The rolling elements of the axial antifriction bearing according to the invention are guided in a cage means formed by an endless band or belt. The advantage consists in avoiding a contact between the individual rolling elements, in a prefabrication of said band and filling it with the rolling elements . It is further advantageous that after assembling the bearing no rolling elements are lost and that guideways for the rolling elements in the form of U-shaped strips between the shaft and the sleeve is no more required. With such guideways there are usually undesired frictional losses. The rolling elements are forced to maintain their proper paths of movement only because of their shape. This arrangement has the further advantage that the single rolling elements may follow a race which deviates depending on the tolerances insignificantly from the longitudinal direction without coming into contact with any fixed guideways which will result in positive greater deflections.

It is proposed by the invention to guide the continuous elastic band around the ends of the sleeve. For this purpose there are provided reversing rings and guideways on these rings which are conically flared on the inlet and outlet. In the reversing region the outer diameter of the reversing rings is greater than the outer diameter of the sleeve while after the reversing of the rolling elements has occured a conical part of the reversing rings guides the rolling elemnts back to the outer diameter of the sleeve. The return movement of the rolling elements occurs in grooves in a cylinder which encloses the running sleeve and which is not required to be hardened.

According to a further feature of the invention the members of the endless band are built in such a manner that resilient parts enclose the rolling elements at their cylindrical parts and form there a guidance in the longitudinal direction without clearance while a displacement of the rolling elements is possible in the circumferential direction about the shaft and sleeve.

The guiding elements are situated between end rings which are secured in the outer cylinder which consists of soft or supple material. The shape of the rings on the inner side corresponds to the envelope circle described by the rolling elements which are reversed in this zone. This results in a double guidance of the rolling elements. According to the invention these end rings may simultaneously provide the sealing on the shaft or column.

In a further appropriate embodiment of the invention the axial antifriction bearing does not entirely surround the shaft. Therefore the shaft can be secured with the free part on its whole length. Thus an extraordinarily rigid longitudinal guidance is obtained. The axial antifriction bearing can be gripped in a clamp for permitting an exact adjustment of clearance.

In accomplishing these and other objects of the invention as hereinafter pointed out there is provided an improved structure preferred embodiments of which are illustrated in the accompanying drawings wherein:

FIGS. 1A and 1B are, respectively, transverse and longitudinal fragmentary sectional illustrations of an axial antifriction bearing of the invention;

FIG. 4 is a fragmentary sectional elevation of a bearing of the invention taken in a plane normal to the axis of a shaft on which the bearing is mounted.

Figure 2A:
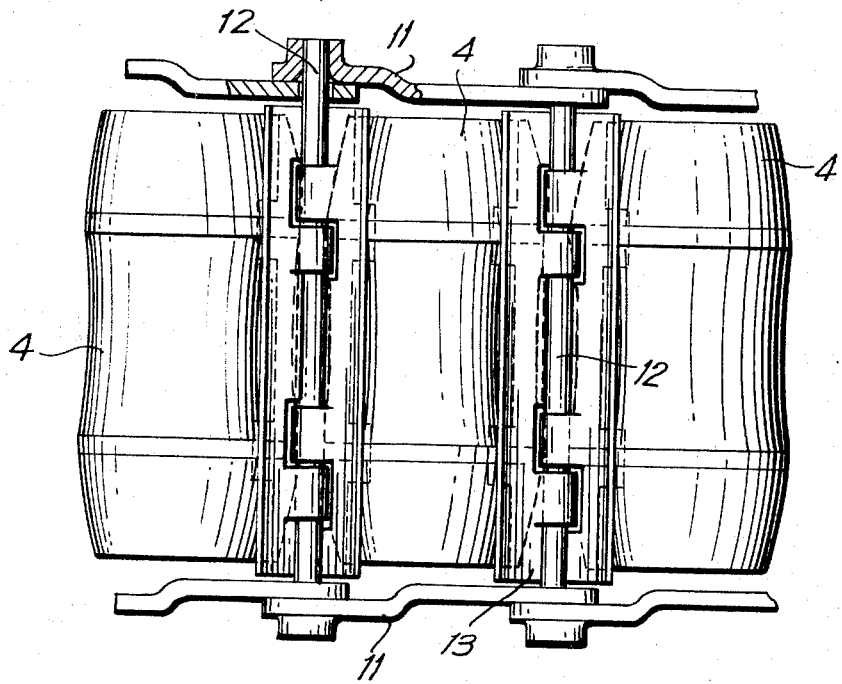
FIGS. 2A and 2B are, respectively a partly sectional top plan and a longitudinal sectional elevation of the structure which maintains the rolling elements in position with respect to each other.

As illustrated in FIGS. 1A and 1B the loaded rolling elements 4 run between the shaft 3 and the sleeve 2. Both ends of the sleeve 2 are somewhat conically flared so that the rolling elements 4 are no longer loaded on this location when coming in and out. The reversing of the rolling elements 4 which are free now occurs by means of the reversing ring 6 the inner diameter of which is equal to the diameter on the end of the sleeve 2 and the outer diameter of which is larger than that of the sleeve. A conical part of the reversing ring 6 encloses the sleeve 2 on the outside. The smallest diameter of this ring is nearly equal to the outer diameter of the sleeve 2. The reversing ring 6 is circumferentially provided with guiding channels for the circulating rolling elements which consist of guideways 7 surrounding the reversing ring 6. Beginning from the top or peak 9 the guideways 7 are conically shaped to a width which guides the single races for the rolling elements in a separated manner.

The sleeve 2 is supported by a soft cylinder 1. The inside of this cylinder 1 is circumferentially provided with longitudinal grooves the number of which corresponds to the number of races for the rolling elements. The rolling elements 4 are able to return freely in the grooves. The grooves may be provided already when casting the cylinder 1. A smooth run of the rolling elements 4 can be secured by means of inserted U-shaped liner-plates or channels which line the grooves and are not shown in the drawings. In front of the grooves the cylinder 1 is conically bored. In this region the rolling elements 4 are returned corresponding to the conical part of the reversing ring 6 to the outer diameter of the sleeve 2. Thus the size of the element can be reduced.

The termination or closure at the ends of the paths of movement of elements 4 between the shaft 3 and the cylinder 1 is formed by the rings 8 which are advantageously made of plastics. The same material is used for the reversing ring 6. On the inside the ring 8 is circumferentially provided with a circular recess the radius of which is somewhat larger than the radius of the enveloping circle described by the reversed rolling elements 4. Therefore there occur transitions on the shaft 3 and on the cylinder 1 so that this ring 8 can also participate in the reversing of the rolling elements 4 as soon as the guidance of the rolling elements take place without a band.

The fastening of the ring 8 in the cylinder 1 is simply made by means of a snap-ring 10. If the ring 8 is built resiliently a prestressing can be obtained on the outer circumference. The inner diameter of the ring 8 is formed as a seal.

Figure 2B:
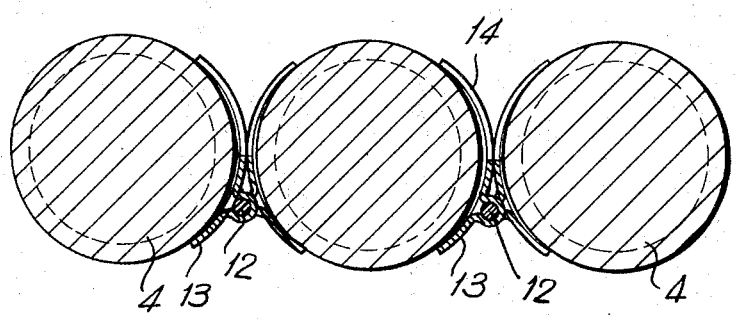

FIGS. 2A and 2B shows the shape of the rolling elements 4 and their guidance in an endless band. The rolling elements consist in their form of a globoidal-shaped middle part of hourglass configuration which is followed on both ends by relatively short cylindrical parts which both pass over into tapered half barrel-shaped parts.

The guiding band (5 in FIG. 1B) consists of members 13, a pin 12 and connecting members 11. The members 13 enclose the rolling elements 4 in a zone in which they do not contact the races. For this purpose their shape is circular. The radius of curvature is smaller than that of the rolling elements. The members 13 guide the rolling elements 4 on their cylindrical parts, only the smaller part of the members 13 extending over the entire length of the rolling elements 4 while the larger part enclosing the rolling elements consists of resilient extensions 14 the width of which is somewhat larger than the cylindrical part of the rolling elements. Each adjacent pair of members 13 are connected by hinge by means of a pin 12. Advantageously these hinges are provided eccentrically beyond the centers of the rolling elements 4. Therefore it is possible to have the single rolling elements run very near to eachother. The pins 12 are connected to the links 11. These links 11 are pivotally mounted on one pin 12, and with the next pin 12 they are secured by a force fit. The pivots are as mentioned located beyond the centers of the rolling bodies 4 and are arranged at the inner reversing circular portion of the path of movement of the rolling elements 4.

Figure 3A:
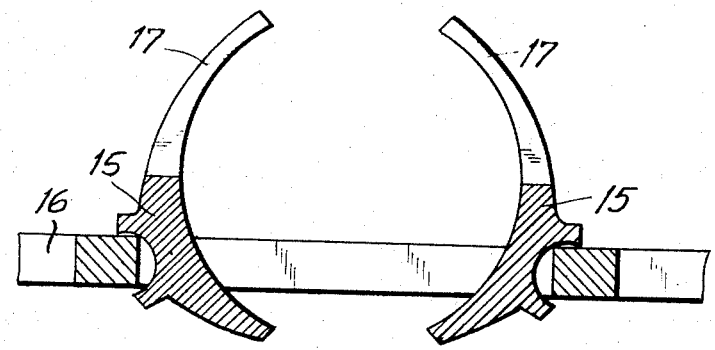
FIGS. 3A and 3B are, respectively, a fragmentary longitudinal sectional elevation and a fragmentary top plan view of another embodiment of a structure for guiding the rolling elements.
Figure 3B:
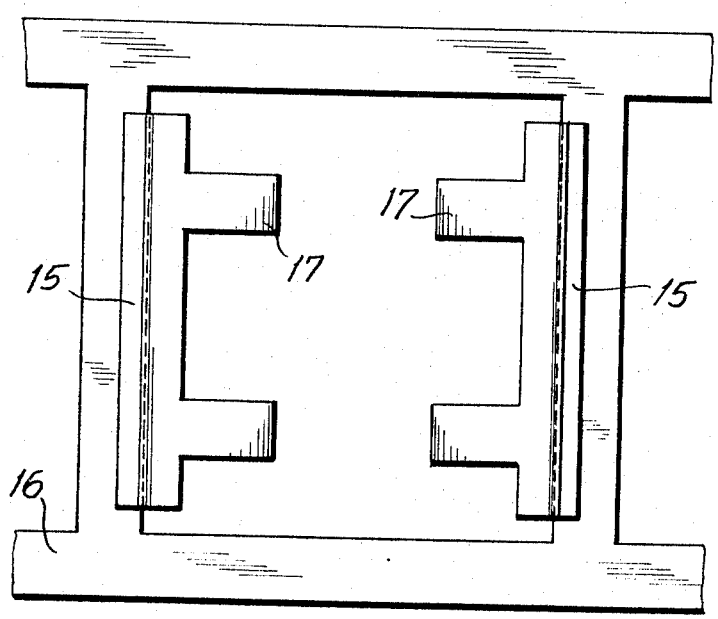

The guiding band of FIGS. 3A and 3B consists of plastics. The endless band 16 has cutouts over its length for the receipt of the rolling elements as well as for the members 17. The shape of the members 17 corresponds to that of the members 13 described above. However the hinge attachments 15 are only half-formed so that the members 17 can move on the transverse portions of the band 16.

The members 15 have also resilient extensions 17. The assembly into an endless band can occur e.g. if two transverse portions of the band 16 are put one over the other and form a fulcrum.

According to FIG. 4 the axial antifriction bearing encloses only about three quarters of the circumference of the shaft 3. In the free quarter the shaft 3 is secured in a V-notch of a bench or machine bed by means of screws 22. Thus a rigid mounting is provided for the shaft 3. The cylinder 1 of the axial antifriction bearing is clamped by a stirrup or grip so that the running clearance of the rolling elements 4 can be adjusted by means of a screw 20 according to the requirements. Such a longitudinal guidance nevertheless guides precisely in all directions, and the direction of the main load is opposite to the securing of the shaft.

Thus it will be seen that with the above-described structure of the invention there are a plurality of rows of roller bodies 4 with each roller body 4 having the elongated intermediate portion of hourglass configuration and the tapered end portions arranged symmetrically with respect thereto, these tapered end portions and central portions being interconnected by the symmetrically arranged cylindrical portions which directly engage the exterior surface of the shaft and the interior surface of the sleeve at the load-carrying zone defined between the exterior surface of the shaft and the interior surface of the sleeve. The elongated bands form a cage means with each band forming for the row of roller bodies with which it coacts part of a means for guiding the row of rollers bodies along the endless path which extends through the load-carrying zone around the ends of and along the exterior of the sleeve 2. This means for defining the endless path also includes the end closure rings 8 as well as the outer cylinder 1 which is particularly formed with the longitudinally extending grooves which define the return portions of the endless paths of the rows of the roller bodies 4.

It will be understood that the invention is not restricted to the possibilities for guiding rolling elements in an endless band shown above but will comprise all the equivalents which belong to the scope of the invention and which are obvious to those skilled in the art.

I claim:

1. An axial roller bearing assembly comprising an elongated shaft and a sleeve member extending circumferentially more than half way around the shaft and being spaced therefrom to define between the sleeve member and the shaft a load-carrying zone, a plurality or rows of roller bodies extending parallel to the axis of said shaft, each roller body having a central elongated portion of hourglass configuration conforming substantially to the circumferential curvature of the shaft and each roller body having a pair of symmetrically arranged tapered end portions between which said central elongated portion is located, each roller body also having a pair of symmetrically arranged cylindrical portions situated between and forming a transition between the end portions and central elongated portion of each roller body, said cylindrical portions of each roller body directly engaging the exterior surface of the shaft and the interior surface of said sleeve member at the load-carrying zone, and means coacting with said roller bodies for forming for each row of roller bodies an endless path of movement extending parallel to the axis of said shaft through the load-carrying zone, around the ends of said sleeve member, and along the exterior thereof, the means which forms the endless path for each row of roller bodies including a cage means coacting with the roller bodies of each row for maintaining them at a given distance from each other in each row, said cage means having resilient portions engaging said cylindrical portions of each roller body on opposite sides of the longitudinal axis of each roller body for maintaining the roller bodies of each row distributed longitudinally in each row without clearance while permitting displacement of the roller bodies circumferentially with respect to said shaft.

2. The combination of claim 1 and wherein said means which forms the endless paths of movement for the rows of roller bodies includes a cylinder in which said sleeve member is located, said cylinder having directed toward sleeve member a surface formed with longitudinal grooves in which the rows of roller bodies are accommodated at the exterior of said sleeve member, and said cylinder being formed at the ends of said grooves thereof with interior tapered portions.

3. The combination of claim 2 and wherein elongated channels of U-shaped cross section line said grooves.

4. The combination of claim 1 and wherein said cage means includes pairs of adjoining curved members engaging the roller bodies and a hinge pin hingedly interconnecting each pair of adjoining curved members, said cage means including links extending along the ends of the roller bodies with each link having a pivotal connection with one hinge pin and a press-fit connection with the next hinge pin.

5. The combination of claim 4 and wherein each curved member has curved extensions forming the resilient positions engaging the cylindrical portions of each roller body and having a smaller radius of curvature than said cylindrical portions of each roller body.

6. The combination of claim 5 and wherein said hinge pins and links are located beyond the axes of said roller bodies between said axes and said sleeve member.

7. The combination of claim 1 and wherein said endless elastic band is made of plastic and is formed with cutouts in which the roller bodies are located with said cutouts being separated by transverse portions of said elastic band, and curved resilient members engaging said transverse portions and extending between the latter and said roller bodies, said resilient members forming the resilient portions engaging the cylindrical portions of said roller bodies.

8. The combination of claim 1 and wherein said means which forms said endless paths of movement for the rows of roller bodies includes a pair of reversing rings respectively fixed to ends of said sleeve member and each reversing ring carrying a plurality of guide channels between which said rows of roller bodies are guided around the ends of said sleeve member, said reversing rings having tapered portions which at the ends of said sleeve member extend outwardly beyond the outer surface thereof and which taper inwardly toward the outer surface of said sleeve member.

9. The combination of claim 1 and wherein said means which forms the endless paths for said rows of roller bodies includes a pair of end rings respectively situated beyond said sleeve member and surrounding said shaft with said end rings being respectively formed with annular grooves extending around said shaft and having hollow interiors directed towards the ends of said sleeve member, said grooves respectively conforming substantially to paths of movement described by said roller bodies as they move around the ends of said sleeve member, and said means which forms said endless paths further including a cylinder in which said sleeve member is located and defining with said sleeve member return portions of said paths along which the rows of roller bodies move at the exterior of said sleeve member, said cylinder surrounding and engaging said end rings and pressing the latter against said exterior surface of said shaft so that said end rings also form a seal with respect to said shaft.

10. The combination of claim 1 and wherein said sleeve member entirely surrounds said shaft.

11. An axial roller bearing assembly comprising an elongated shaft and a sleeve member extending circumferentially more than half way around the shaft and being spaced therefrom to define between the sleeve member and the shaft a load-carrying zone, a plurality or rows of roller bodies extending parallel to the axis of said shaft, each roller body having a central elongated portion of hourglass configuration conforming substantially to the circumferential curvature of the shaft and each roller body having a pair of symmetrically arranged tapered end portions between which said central elongated portion is located, each roller body also having a pair of symmetrically arranged cylindrical portions situated between and forming a transition between the end portions and central elongated portion of each roller body, said cylindrical portions of each roller body directly engaging the exterior surface of the shaft and the interior surface of said sleeve member at the load-carrying zone, and means coacting with said roller bodies for forming for each row of roller bodies an endless path of movement extending parallel to the axis of said shaft through the load-carrying zone, around the ends of said sleeve member, and along the exterior thereof, said sleeve member extending only part way circumferentially around said shaft and a support means fixedly carrying said shaft at a part thereof which is situated beyond said sleeve member, a cylinder surrounding said sleeve member and formed with interior grooves along which said rows of roller bodies travel at the exterior of said sleeve member, and clamp means gripping and compressing said cylinder for regulating the clearance of the roller bodies.

* * * * *